(12) United States Patent
Shibata (10) Patent No.: US 6,491,159 B2
(45) Date of Patent: Dec. 10, 2002

(54) PACKAGING BAG (75) Inventor: Yukihiko Shibata, Nagoya (JP)

(73) Assignee: Daiwa Gravure Co., Ltd., Aichi (JP)

( * ) Notice: Subject to any disclaimer, the term of this patent is extended or adjusted under 35 U.S.C. 154(b) by 46 days.

(21) Appl. No.: 09/799,138

(22) Filed: Mar. 5, 2001

(65) Prior Publication Data

US 2001/0030133 A1 Oct. 18, 2001

(30) Foreign Application Priority Data

Apr. 17, 2000 (JP) ........................................ 2000-114475

(51) Int. Cl.⁷ ............................................... B65D 25/08
(52) U.S. Cl. ........................ 206/219; 428/35.2; 264/471
(58) Field of Search ................................ 206/219–220, 206/484; 264/471, 171.27; 428/39.2, 36.91

(56) References Cited

U.S. PATENT DOCUMENTS

| | | | | |
|---|---|---|---|---|
| 3,608,709 A | * | 9/1971 | Pike | |
| 4,462,224 A | * | 7/1984 | Dunshee et al. | |
| 4,776,455 A | * | 10/1988 | Anderson et al. | |
| 4,988,465 A | * | 1/1991 | Lustig et al. | |
| 5,075,119 A | | 12/1991 | Mendenhall | ................. 426/113 |
| 5,243,164 A | | 9/1993 | Erickson et al. | ...... 219/10.55 E |
| 5,287,961 A | * | 2/1994 | Herran | |
| 5,494,190 A | * | 2/1996 | Boettcher | |
| 5,981,048 A | * | 11/1999 | Sugimoto et al. | |
| 5,993,949 A | * | 11/1999 | Rosenbaum et al. | |
| 6,083,584 A | * | 7/2000 | Smith et al. | |
| 6,094,889 A | * | 8/2000 | Van Loon et al. | |
| 6,186,998 B1 | * | 2/2001 | Imuzuka et al. | |
| 6,254,946 B1 | * | 7/2001 | Hirata et al. | |
| 6,383,583 B1 | | 5/2002 | Ninomiya et al. | ......... 428/35.4 |
| 6,391,407 B1 | * | 5/2002 | Kashiba et al. | |

\* cited by examiner

Primary Examiner—Shian Luong
(74) Attorney, Agent, or Firm—Fildes & Outland, P.C.

(57) ABSTRACT

To provide a packaging bag that eliminates need to house plural types of contents in separate packaging bags and which can be used easily, wherein plural types of contents are separately housed in each partitioning space of a single packaging bag so as to be mixed together upon being used. Thus, there is provided a packaging bag made of a synthetic resin film, wherein a layer constituting an inner surface is formed of a blend of straight-chain low-density polyethylene resin and polybutene-1 resin, and an internal space of the packaging bag is partitioned by a partitioning heat sealed portion that is parallel with opposite heat sealed portions perpendicular to a film flowing direction and which is narrower than the opposite heat sealed portions, thereby forming a plurality of housing spaces.

8 Claims, 10 Drawing Sheets

PACKAGING BAG

FIELD OF THE INVENTION

The present invention relates to a packaging bag made of a synthetic resin film and configured to have its interior partitioned into a plurality of portions so that contents can be housed in each of partitioned spaces.

BACKGROUND OF THE INVENTION

Conventionally, when a two-liquid-mixed adhesive, for example, is to be used, two types of liquids are mixed together to cause adhesion, but must be separated from each other so as not to contact with each other until the use of the two-liquid-mixed adhesive. In this case, the two types of liquids are housed in separate containers and are taken out therefrom and mixed together when the two-liquid-mixed adhesive is to be used.

Disadvantageously, however, the two containers for housing the two types of liquids must be stored until the use of the two-liquid-mixed adhesive, and it will be impossible to use the two-liquid-mixed adhesive if any one of the containers is lost.

SUMMARY OF THE INVENTION

The present invention solves such a problem, and it is an object thereof to provide a packaging bag that eliminates need to house plural types of contents in separate packaging bags and which can be used easily, wherein plural types of contents are separately housed in each partitioned space of a single packaging bag so as to be mixed together inside the packaging bag upon being used.

The subject matters of the present invention for attaining this object are as follows.

1. A packaging bag made of a synthetic resin film as a material, wherein a layer constituting an inner surface is formed of a blend of straight-chain low-density polyethylene resin and polybutene-1 resin, and an internal space of the packaging bag is partitioned by partitioning heat sealed portions that are parallel with opposite heat sealed portions extending perpendicularly to a flowing direction of the film and which are narrower than the opposite heat sealed portions, so as to form a plurality of housing spaces.

2. The packaging bag according to claim 1, wherein a blend ratio between the straight-chain low-density polyethylene resin and the polybutene-1 resin is between 70:30 and 98:2.

3. A packaging bag made of a synthetic resin film as a material, wherein a layer constituting an inner surface is formed of a blend of straight-chain low-density polyethylene resin and polybutene-1 resin, and an internal space of the packaging bag is partitioned by partitioning heat sealed portions having a heat sealed portion that is parallel with opposite heat sealed portions extending perpendicularly to a flowing direction of the film and which is narrower than the opposite heat sealed portions, so as to form a plurality of housing spaces.

4. The packaging bag according to claim 3, wherein a blend ratio between the straight-chain low-density polyethylene resin and the polybutene-1 resin is between 70:30 and 98:2.

5. A packaging bag made using a synthetic resin film as a material, wherein a layer constituting an inner surface is formed of a blend of straight-chain low-density polyethylene resin and polybutene-1 resin, and an internal space of the packaging bag is partitioned by partitioning heat sealed portions that are formed obliquely with respect to opposite heat sealed portions extending perpendicularly to a flowing direction of the film and which are narrower than the opposite heat sealed portions, so as to form a plurality of housing spaces.

6. The packaging bag according to claim 5, wherein a blend ratio between the straight-chain low-density polyethylene resin and the polybutene-1 resin is between 70:30 and 98:2.

7. A packaging bag made using a synthetic resin film as a material, wherein a layer constituting an inner surface is formed of a blend of straight-chain low-density polyethylene resin and polybutene-1 resin, and an internal space of the packaging bag is partitioned by partitioning heat sealed portions having a heat sealed portion that is formed obliquely with respect to opposite heat sealed portions extending perpendicularly to a flowing direction of the film and which is narrower than the opposite heat sealed portions, so as to form a plurality of housing spaces.

8. The packaging bag according to claim 7, wherein a blend ratio between the straight-chain low-density polyethylene resin and the polybutene-1 resin is between 70:30 and 98:2.

This configuration provides a packaging bag that eliminates the need to house plural types of contents in separate packaging bags and which can be used easily, in which plural types of contents such as those to be mixed together upon being used are separately housed in each partitioned housing space of the packaging bag so that before the contents are used, the partitioned housing spaces are externally pressed to increase the internal pressure of the partitioned housing spaces to break the partitioning heat sealed portions in order to mix together the contents housed in the housing spaces.

DESCRIPTION OF THE EMBODIMENTS

FIGS. 1 to 7 show a first embodiment.

In FIGS. 1 to 7, a packaging bag 1 is made by means of a four-way seal so as to internally house two types of liquids (not shown) for a two-liquid-mixed adhesive, wherein a layer 2 constituting an inner surface side₁₃ @ of the bag, or a seal surface, comprises a film material comprising a blend of straight-chain low-density polyethylene and polybutene-1 resin. The packaging bag 1 is made of a film material of a two-layer structure formed by laminating a layer 3 on the layer 2 constituting the inner surface side, the layer 3 comprising a resin having a higher melting point than the layer 2, for example, biaxial oriented nylon and constituting an outer surface side.

The inventor has found that when this film material is used to make the packing bag 1 by means of heat sealing, a difference occurs in heat seal strength between heat sealed portions extending perpendicularly (X) to the flowing direction (shown by an arrow A) of the film and heat sealed portions extending parallel (Y) with the film flowing direction (shown by the arrow A). That is, the tendency is that the strength in a width direction of the perpendicular (X) heat sealed portions which extends parallel with the film flowing direction (shown by the arrow A) is lower than that in a width direction of the parallel (Y) heat sealed portions which extends perpendicularly to the film flowing direction.

Figure 3:
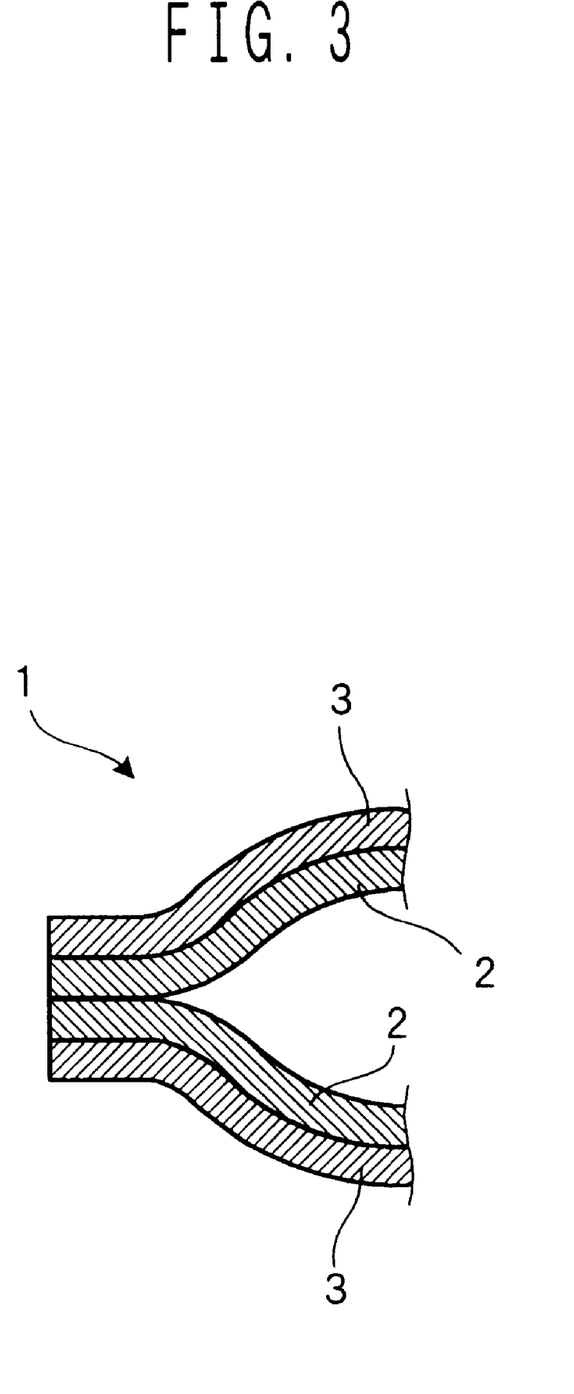
FIG. 3 is an enlarged sectional view of the packaging bag.

This occurs for the following reasons: A resin used as a material of the layer 2 constituting the inner surface side of the packaging bag 1 is a blend of straight-chain low-density polyethylene and polybutene-1, and the film formation speed of the layer 2 comprising the blended film material and constituting the inner surface side causes the straight-chain low-density polyethylene and the polybutene-1 to show uniaxial orientation. That is, a straight-chain low-density polyethylene resin and a polybutene-1 resin are irregularly arranged to form the film. This state is shown in FIG. 3, where reference numeral 4 denotes a straight-chain low-density polyethylene resin and reference numeral 5 denotes a polybutene-1 resin.

Figure 4:
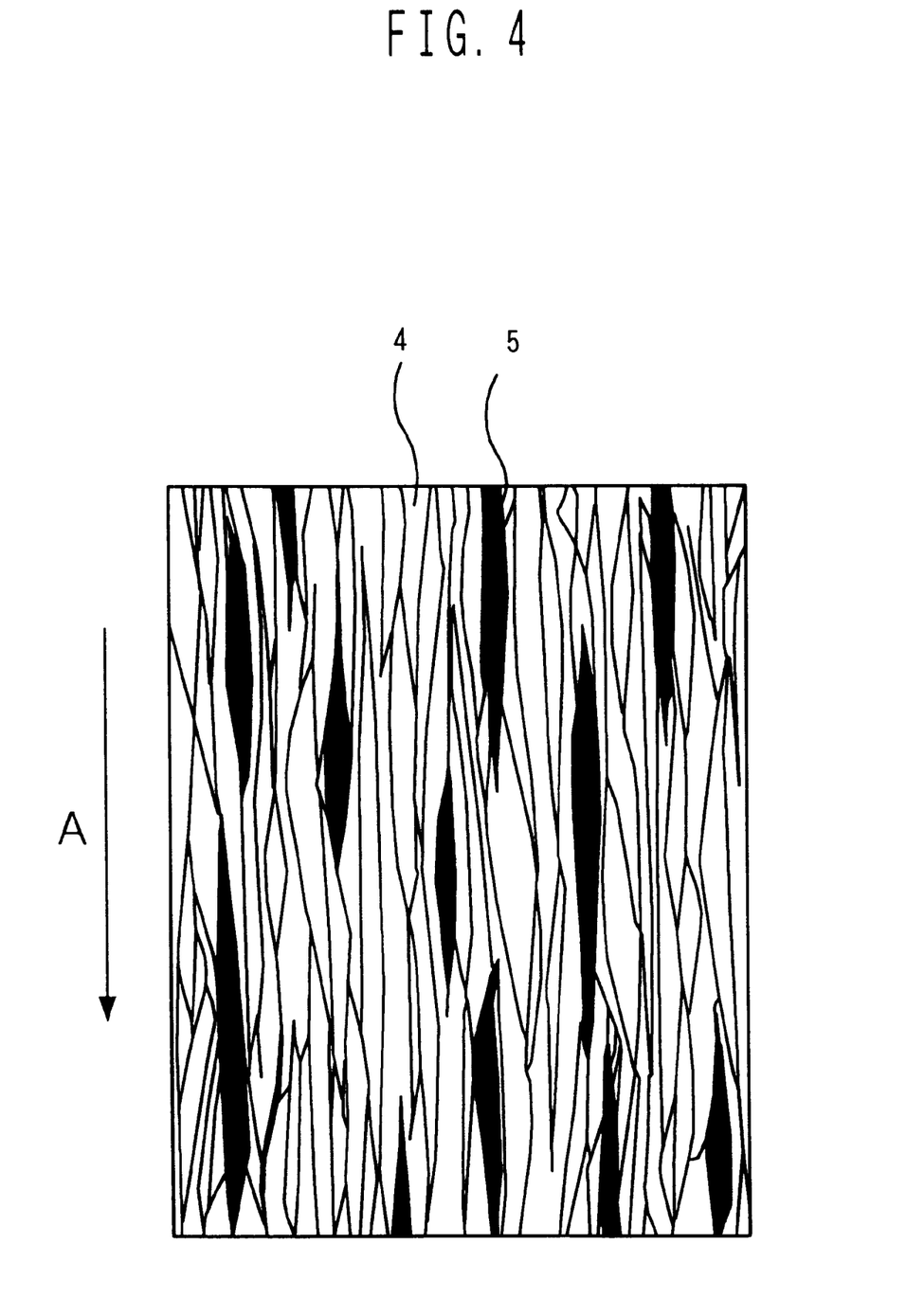
FIG. 4 is a view useful in explaining orientations of resins.

Since the layer 2 constituting the inner surface side thus has uniaxial orientation, when two of the film material of the two layer structure are placed on each other and have their peripheries heat-sealed in order to make a packaging bag 1 with a four-way seal, three patterns of combinations of the resins are formed where 4 parts of straight-chain low-density polyethylene resin and 4 parts of straight-chain low-density polyethylene resin, 5 parts of polybutene-1 resin and 5 parts of polybutene-1 resin, or 4 parts of straight-chain low-density polyethylene resin and 5 parts of polybutene-1 resin are opposite to each other, as shown in FIG. 4. In the case of the combination of the 4 parts of straight-chain low-density polyethylene resin and the 4 parts of straight-chain low-density polyethylene resin and the combination of the 5 parts of polybutene-1 resin and the 5 parts of polybutene-1 resin, the resins of the same type are heat-sealed, so the heat seal strength is obtained within the range of the characteristics of the resins.

However, in a portion where the 4 parts of straight-chain low-density polyethylene resin and the 5 parts of polybutene-1 resin are opposite to each other, the resins of the different types are arranged face to face, making it difficult to obtain the heat seal strength corresponding to the individual characteristics. Such states are mixed together on the heat seal surface. The following phenomenon occurs due to the uniaxial orientation, the heat seal characteristics originating from the combinations of the three patterns, and a heat sealing direction.

Figure 5:
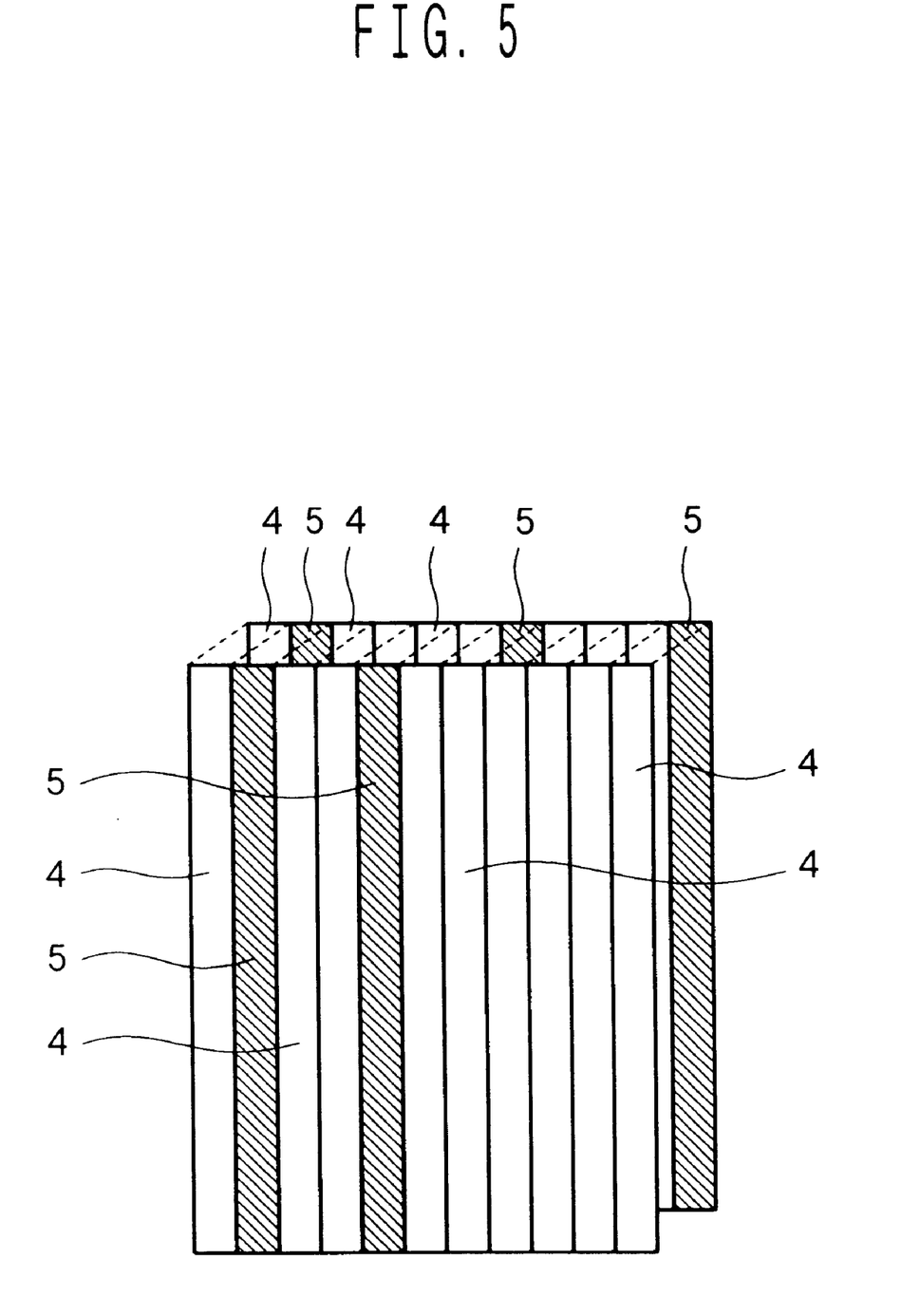
FIG. 5 is a view useful in explaining how straight-chain low-density polyethylene resin portions and polybutene-1 resin portions are combined together in a heat sealed portion.

The combinations of the three patterns appear irregularly at a sealed edge in that width direction of the heat sealed portions perpendicular (X) to the film flowing direction (shown by the arrow A) which corresponds to the film flowing direction (shown by the arrow A) (see FIG. 5). In contrast, one of the combinations of the three patterns appears at a sealed edge in that width direction of the heat sealed portions parallel (Y) with the film flowing direction (shown by the arrow A) which extends perpendicularly to the film flowing direction (shown by the arrow A) (see FIG. 6).

Since the combinations of the three patterns appear irregularly in that width direction of the heat sealed portions perpendicular (X) to the film flowing direction (shown by the arrow A) which extends parallel with the film flowing direction (shown by the arrow A), the percentage of the total heat seal width taken up by the combination of 4 parts of straight-chain low-density polyethylene resin and the 4 parts of straight-chain low-density polyethylene resin and the combination of the 5 parts of polybutene-1 resin and the 5 parts of polybutene-1 resin, both combinations providing the appropriate strength, is lower than 100%, and the presence of the combination of the 4 parts of straight-chain low-density polyethylene resin and the 5 parts of polybutene-1 resin reduces the heat seal strength.

In that width direction of the heat sealed portions parallel (Y) with the film flowing direction (shown by the arrow A) which extends perpendicularly to the film flowing direction (shown by the arrow A), either the combination of 4 parts of straight-chain low-density polyethylene resin and the 4 parts of straight-chain low-density polyethylene resin or the combination of the 5 parts of polybutene-1 resin and the 5 parts of polybutene-1 resin or the combination of the 4 parts of straight-chain low-density polyethylene resin and the 5 parts of polybutene-1 resin may appear at the sealed edge due to the uniaxial orientation of molecules.

When the heat seal strength is compared between that width direction of the heat sealed portions perpendicular (X) to the film flowing direction (shown by the arrow A) which extends parallel with the film flowing direction and that width direction of the heat sealed portions parallel (Y) with the film flowing direction which extends perpendicularly to the film flowing direction (shown by the arrow A), it is high if the combination of 4 parts of straight-chain low-density polyethylene resin and the 4 parts of straight-chain low-density polyethylene resin or the combination of the 5 parts of polybutene-1 resin and the 5 parts of polybutene-1 resin appears, whereas it is low if the combination of the 4 parts of straight-chain low-density polyethylene resin and the 5 parts of polybutene-1 resin appears.

The heat sealing strength refers to the strength of the sealed edge, and in that width direction of the heat sealed portion perpendicular (X) to the film flowing direction (shown by the arrow A) which corresponds to the film flowing direction, the combination of the 4 parts of straight chain low-density polyethylene rein and the 4 parts of straight chain low-density polyethylene rein, the combination of the 5 parts of polybutene-1 resin and the 5 parts of polybutene-1 resin 5 portion, and the combination of the 4 parts of straight chain low-density polyethylene rein and the 5 parts of polybutene-1 resin appear randomly in the perpendicular (X) direction as shown in FIG. 5, thereby reducing breaking resistance strength.

Figure 6:
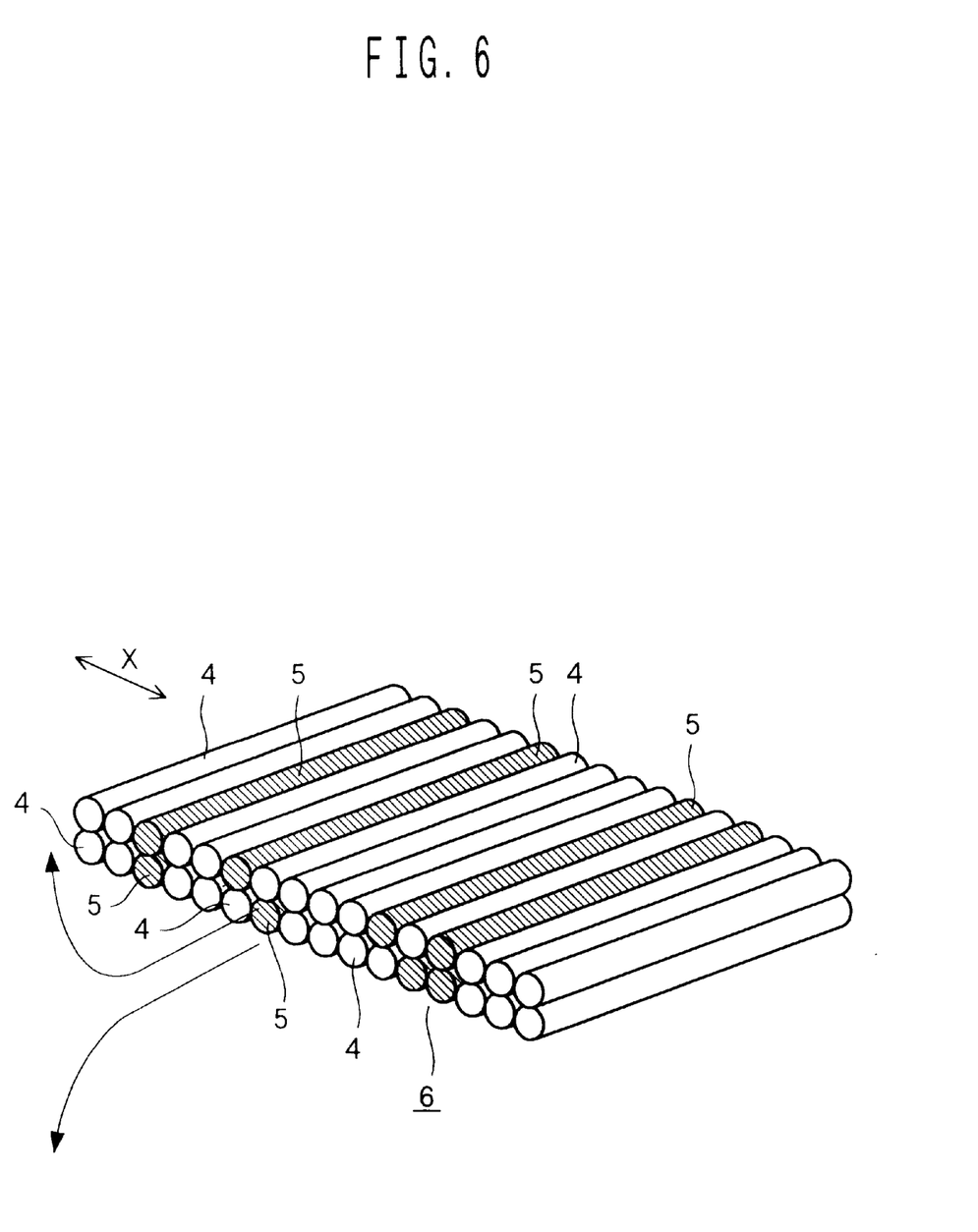
FIG. 6 is an enlarged view of an integral part of a shorter_@ side sealed edge of the heat sealed portions.
Figure 7:
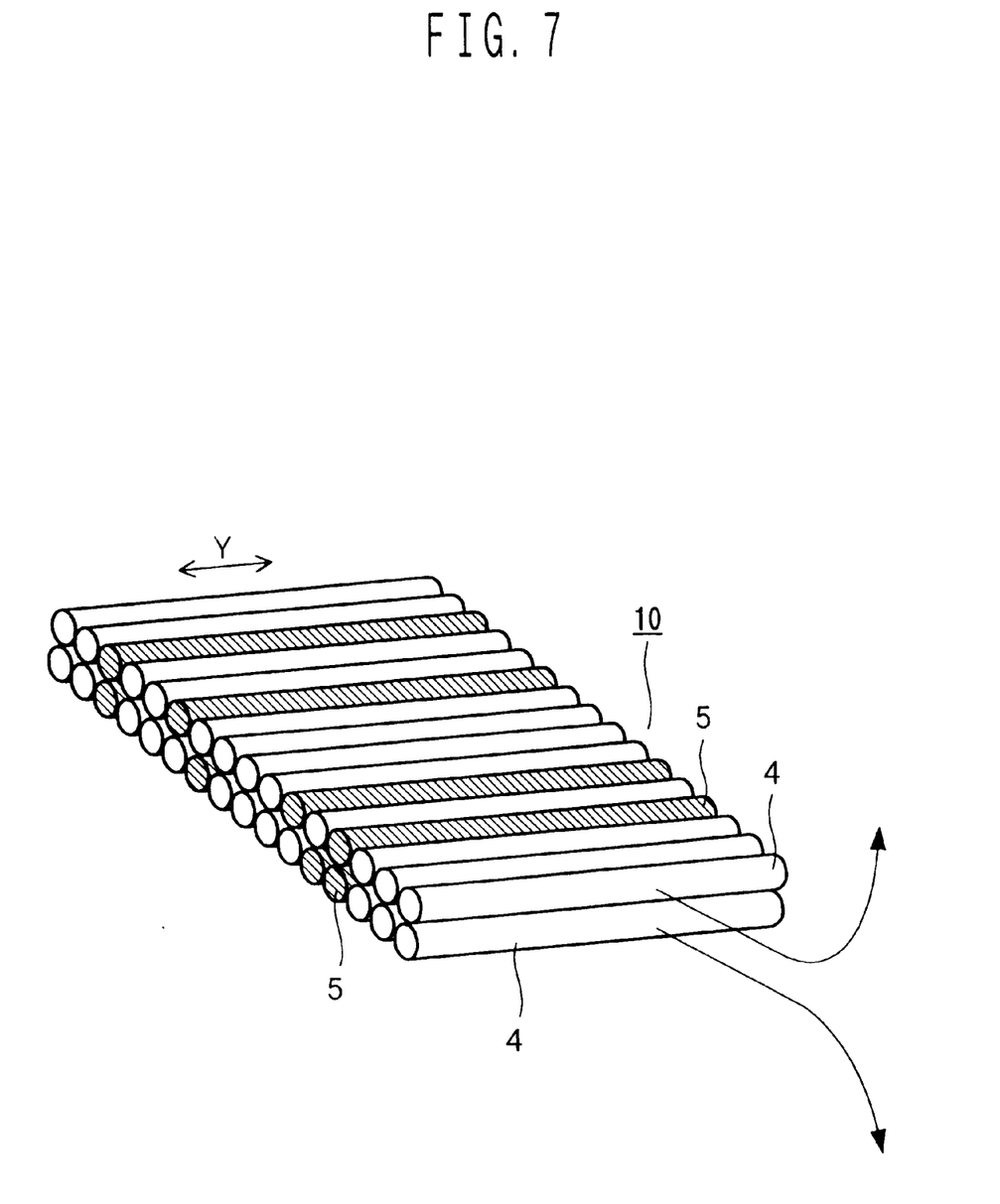
FIG. 7 is an enlarged view of an integral part of a longer side sealed edge of the heat sealed portions.

In contrast, in that width direction of the heat sealed portion parallel (Y) with the film flowing direction which extends perpendicularly to the film flowing direction, the combination of the 4 parts of straight chain low-density polyethylene rein and the 4 parts of straight chain low-density polyethylene rein and the combination of the 5 parts of polybutene-1 resin and the 5 parts of polybutene-1 resin 5 appear along the entire length of the heat sealed portion in its width direction and the film flowing direction (shown by the arrow A), as shown in FIG. 6.

Accordingly, where the combination of the 4 parts of straight chain low-density polyethylene rein and the 5 parts of polybutene-1 resin appears, the strength is low and the heat sealed portion is broken, but, at the next moment, if the combination of the 4 parts of straight chain low-density polyethylene rein and the 4 parts of straight chain low-density polyethylene rein, and the combination of the 5 parts of polybutene-1 resin and the 5 parts of polybutene-1 resin appear, the heat sealing strength becomes higher. In total, the heat sealing strength is higher in that width direction of the heat sealed portion perpendicular (X) to the film flowing direction (shown by the arrow A) which corresponds to the film flowing direction than in that width direction of the heat sealed portion parallel (Y) with the film flowing direction which extends perpendicularly to the film flowing direction.

To realize this characteristic, the straight-chain low-density polyethylene and polybutene-1 that are the material of the layer 2 constituting the inner surface side as previously described preferably have a blend ratio between 70:30 and 98:2. If the blend ratio is out of the range between 70:30 and 98:2, a clear difference in heat sealing strength occurs between that width direction of the heat sealed portion perpendicular (X) to the film flowing direction (shown by the arrow A) which corresponds to the film flowing direction and that width direction of the heat sealed portion parallel (Y) with the film flowing direction which extends perpendicularly to the film flowing direction, thereby preventing the object of the present invention from being achieved easily.

Figure 1:
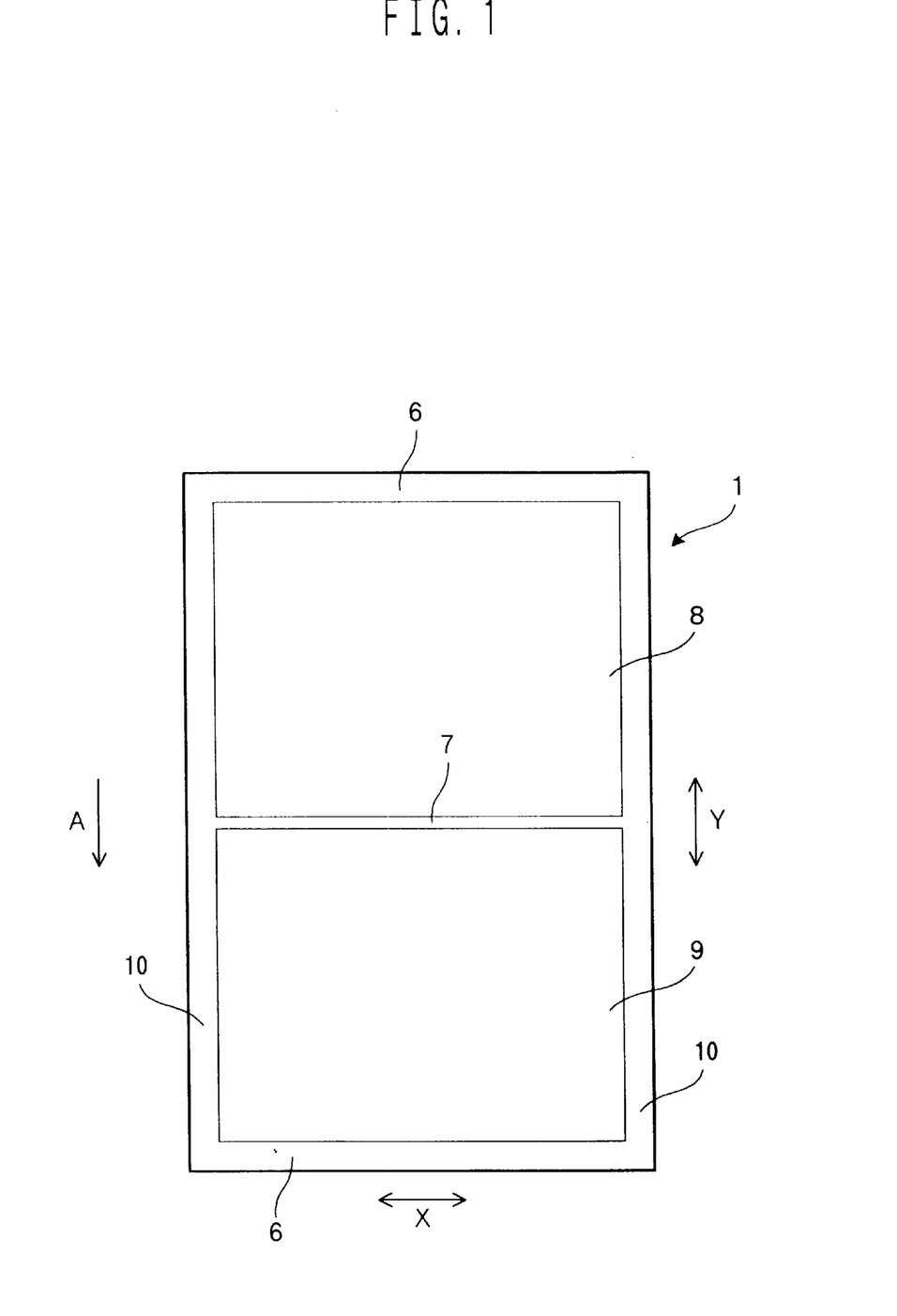
FIG. 1 is a top view of a packaging bag according to a first embodiment of the present invention.
Figure 2:
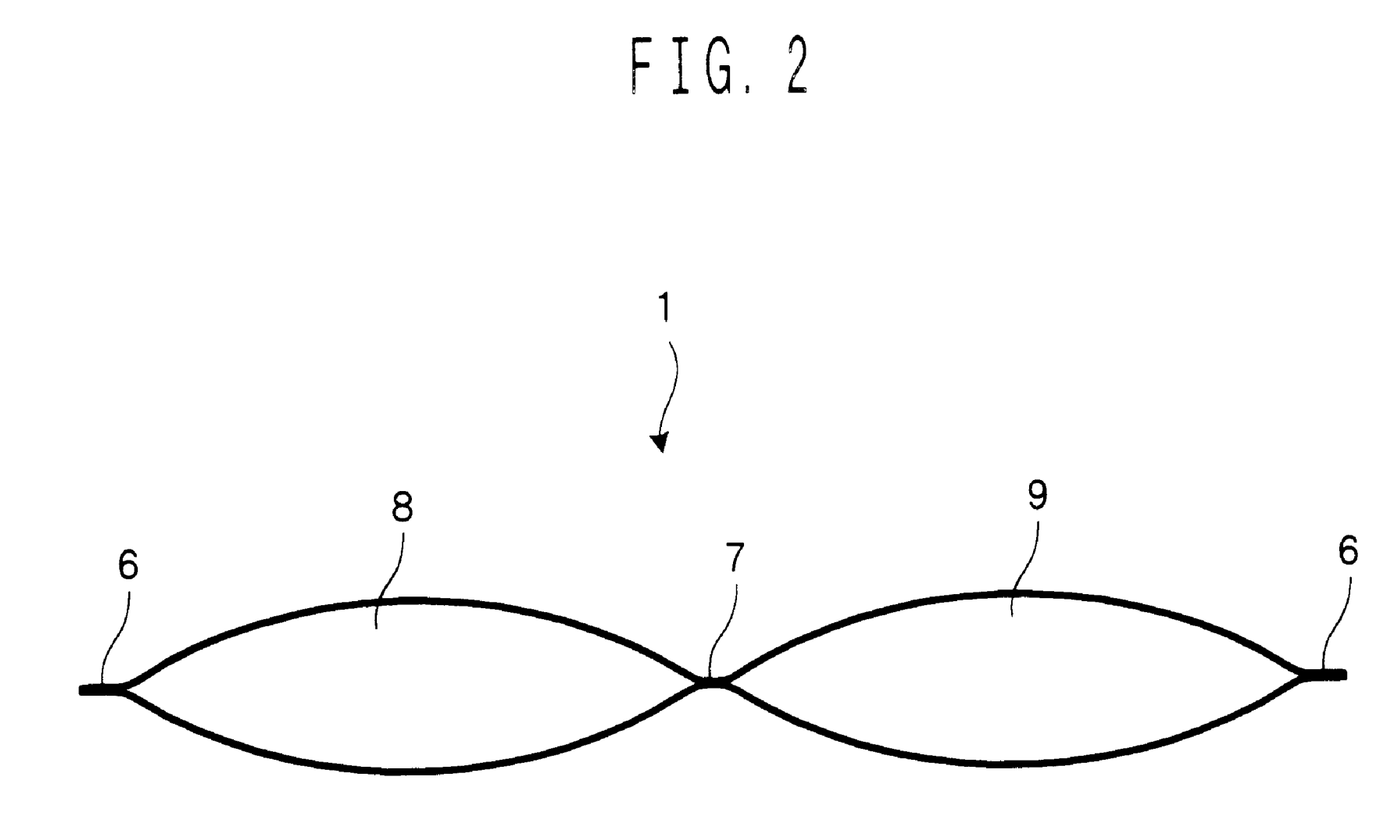
FIG. 2 is a sectional view of the packaging bag.

In this embodiment, based on the above described characteristics, two pieces of the above described two-layered film material are placed on each other and peripheries thereof are heat-sealed together to produce the planar rectangular packaging bag 1 with the four-way seal as shown in FIG. 1.

The packaging bag 1 has its internal space partitioned by a heat sealed portion 7 that extends perpendicularly (X) to the film flowing direction (shown by the arrow A), that is, parallel with a shorter side heat sealed portion 6 and which is narrower than the shorter side heat sealed portion 6, thereby forming two housing spaces 8 and 9. In this case, the heat sealing strength in the width direction of the heat sealed portion 6 perpendicular (X) to the film flowing direction (shown by the arrow A), that is, the shorter side heat sealed portion 10, which width direction corresponds to the film flowing direction is set lower than that in the width direction of the heat sealed portion 6 parallel (Y) with the film flowing direction, that is, the longer side heat sealed portion 10, which width direction corresponds to the film flowing direction.

Consequently, when at least one of the housing spaces 8 and 9 partitioned by the partitioning heat sealed portion 7 is externally pressed, the internal pressure of the at least one of the housing spaces 8 and 9 increases to break the partitioning heat sealed portion 7, thereby mixing together the contents housed in the housing spaces 8 and 9. Methods for externally pressing the housing spaces 8 and 9 partitioned by the partitioning heat sealed portion 7 includes placing the packaging bag 1 on a floor and stepping on one of the partitioning spaces 8 and 9 from above, as well as placing the packaging bag 1 on a table and pressing one of the partitioning spaces 8 and 9 with a hand from above. In this case, if the packaging bag 1 is folded from its end on the side of the one of the housing spaces 8 and 9 which is to be pressed, to press the interior of the one of the partitioning spaces, the force required to press the bag with a foot or hand decreases to facilitate the breaking of the partitioning heat sealed portion 7.

Then, the partitioning heat sealed portion 7 is broken and two types of liquids for a two-liquid-mixed adhesive which are contents housed in the housing spaces 8 and 9 are mixed together and react to each other, so that an adhesive obtained by mixing the two types of liquids together can be taken out from an opening formed by cutting the packaging bag 1 in part of the heat sealed portion in the periphery of the bag using a pair of scissors. Before thus cutting the packaging bag 1 in part of the heat sealed portion in the periphery of the bag using a pair of scissors, the packaging bag 1 may be rubbed by hand in order to facilitate the reaction for the two-liquid-mixed adhesive.

As described above, the interior of the packaging bag 1 is partitioned by the partitioning heat sealed portion 7 that is narrower than the shorter side heat sealed portion 6 so that at least one of the housing spaces 8 and 9 is externally pressed to break the partitioning heat sealed portion 7 to mix together the contents housed in the housing spaces 8 and 9. Then, when the packaging bag 1 is externally pressed to increase the internal pressure of the housing spaces 8 and 9, the shorter side heat sealed portion 6 is broken simultaneously with the partitioning heat sealed portion 7. Since, however, the shorter side heat sealed portion 6 is formed to be wider than the partitioning heat sealed portion 7, the shorter side heat sealed portion 6 is incompletely broken even when the partitioning heat sealed portion 7 is completely broken, thereby preventing occurrence of an opening.

In this regard, the contents housed in the packaging bag 1 are not limited to the two-liquid-mixed adhesive, but may be a three- or four-liquid-mixed adhesive; in this case, the interior of the packaging bag 1 may be partitioned into three or four, respectively. Additionally, the contents housed in the packaging bag 1 are not limited to the above described two-liquid-mixed adhesive, but may be two types of agents that are mixed together to react to heat up or cool down by themselves when the partitioning heat sealed portion is broken, a cleaner (detergent) formed by mixing two types of materials together, or a food (or a drink) formed by mixing two types of materials together.

Figure 8:
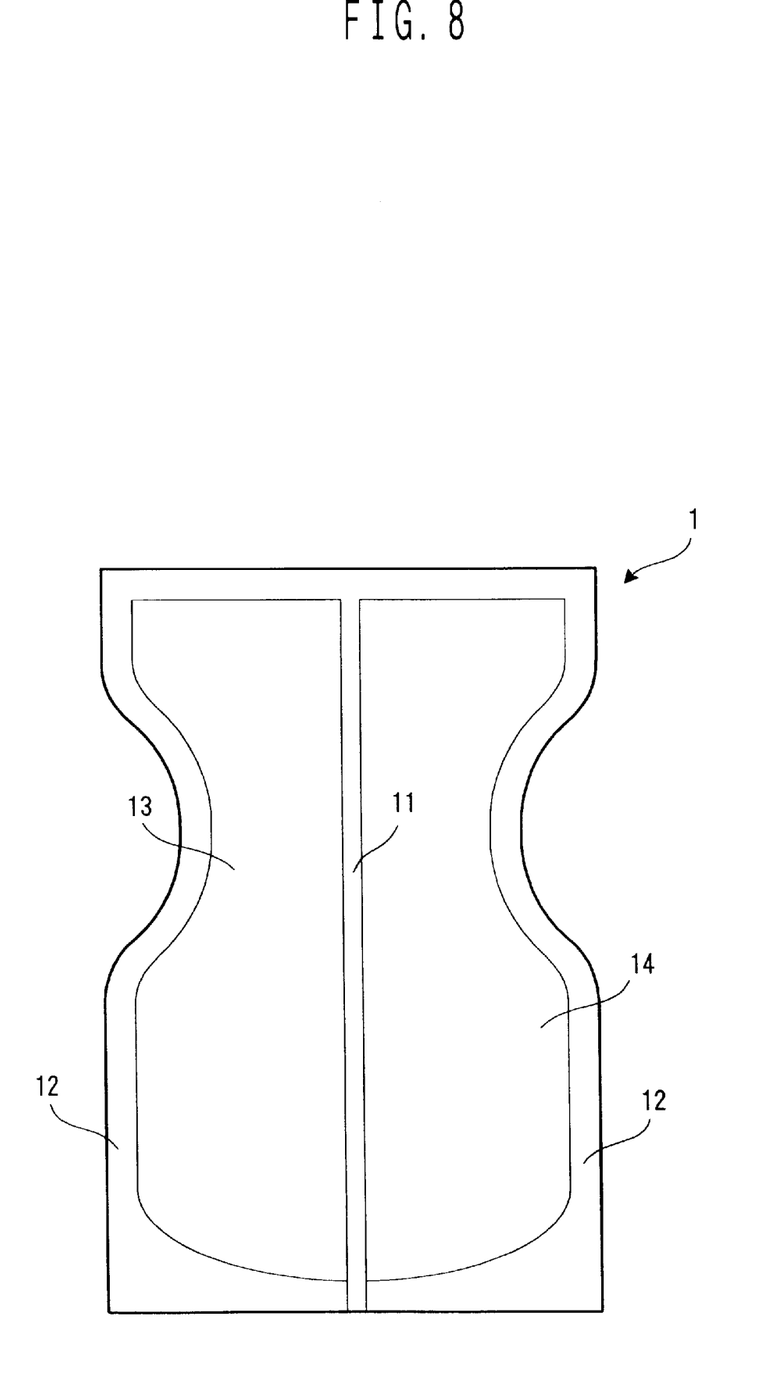
FIG. 8 is a top view of a packaging bag according to a second embodiment of the present invention.

FIG. 8 shows a second embodiment.

The second embodiment will be described with reference to FIG. 8. In the first embodiment, the packaging bag 1 with the four-way seal has the partitioning heat sealed portion 7 formed therein, while in the second embodiment, a stand pack type packaging bag 1 has a partitioning heat sealed portion 11 formed therein. In the stand pack type packaging bag 1, longer side heat sealed portions 12 on both sides thereof extend perpendicularly to the film flowing direction, a partitioning heat sealed portion 11 that is narrower than heat sealed portions 12 on the respective sides of the bag is provided between the heat sealed portions 12 in parallel therewith to form two housing spaces 13 and 14 inside the packaging bag 1. An intermediate portion between the heat sealed portions 12 and 12 on the respective sides is constricted in the middle.

Figure 9:
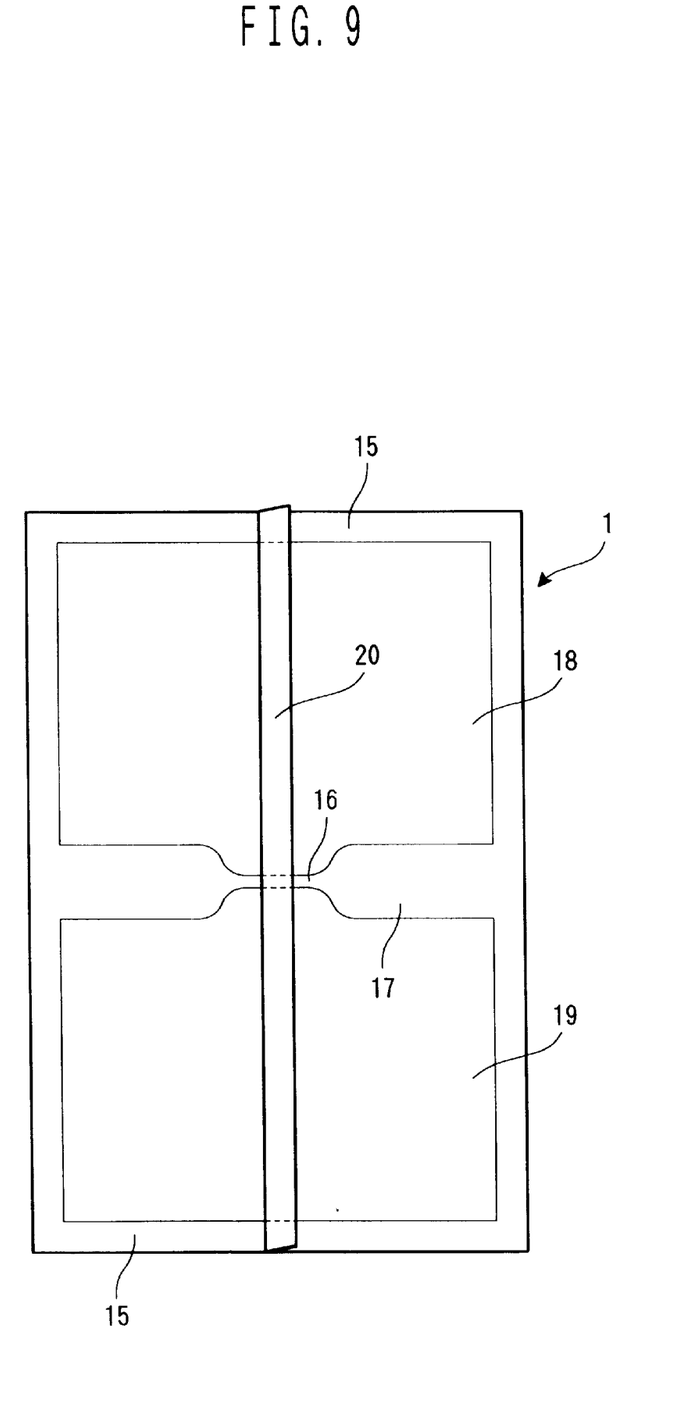
FIG. 9 is a top view of a packaging bag according to a third embodiment of the present invention.

FIG. 9 shows a third embodiment of the present invention.

This embodiment will be described with reference to FIG. 9. According to the third embodiment, in a packaging bag 1 in the form of joined palms, a partitioning heat sealed portion 17 having a heat sealed portion 16 that is narrower than shorter side heat sealed portions 15 extending perpendicularly to the film flowing direction is provided between the shorter side heat sealed portions 15 and 15 in parallel therewith so that two housing spaces 18 and 19 are formed inside the packaging bag 1. Reference numeral 20 denotes the heat sealed portion in a joined state.

As in this third embodiment, the heat sealed portion 16 that is narrower than the shorter side heat sealed portions 15 and 15 is provided in the middle of the partitioning heat sealed portion 17 so that when one of the housing spaces 18 and 19 is eternally pressed, the internal pressure of the at least one of the housing spaces 18 and 19 increases to break the heat sealed portion 16 to mix together the contents housed in the housing spaces 18 and 19.

Figure 10:
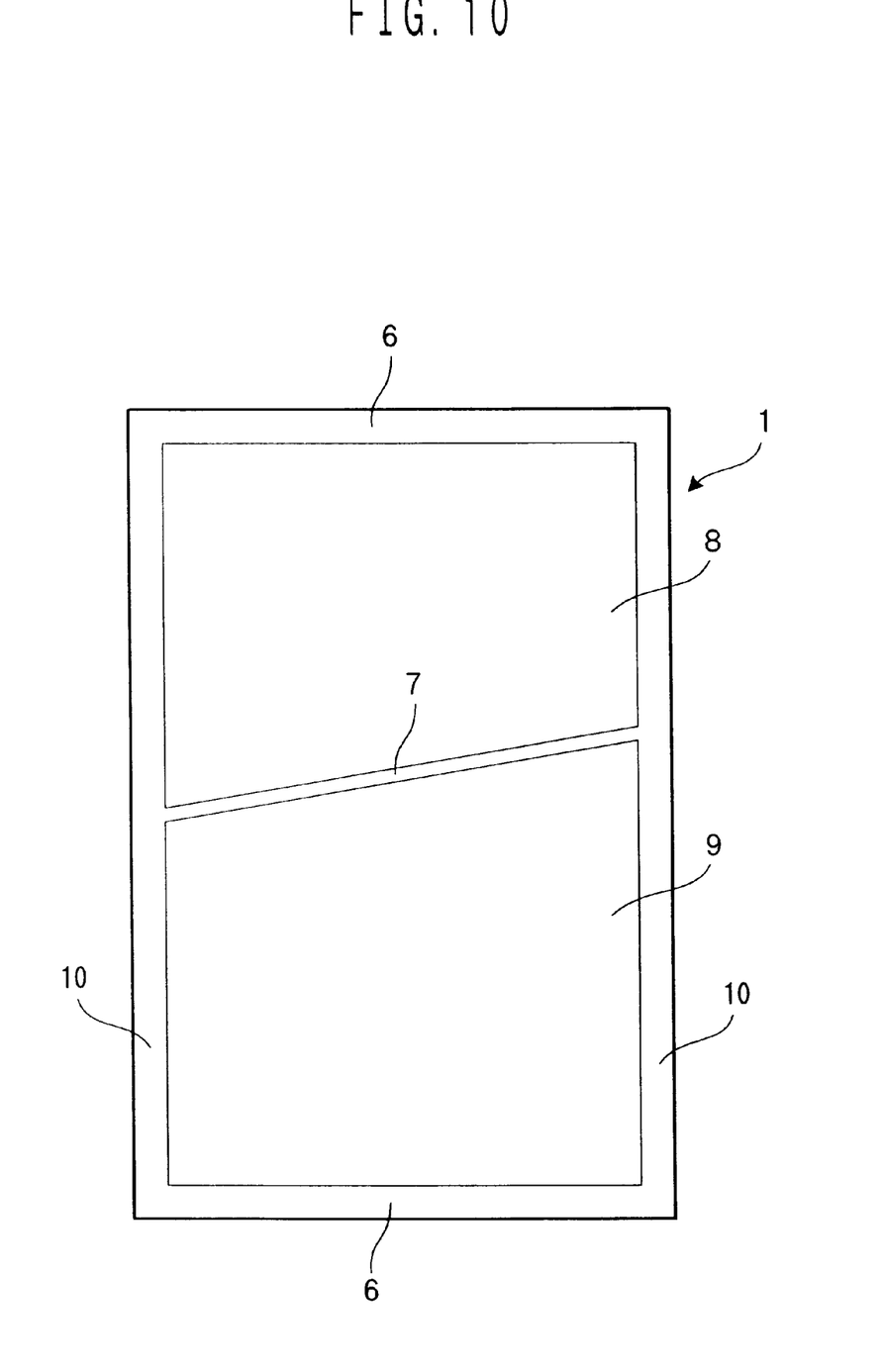
FIG. 10 is a top view of a packaging bag according to a fourth embodiment of the present invention.

FIG. 10 shows a fourth embodiment of the present invention.

This embodiment will be explained with reference to FIG. 10. According to this embodiment, the packaging bag 1 with the four-way seal according to the first embodiment has a partitioning heat sealed portion 7 formed obliquely with respect to the shorter side heat sealed portion 6 thereof extending perpendicularly to the film flowing direction, the partitioning heat sealed portion having its angle set so as to obtain a required breaking strength. The concept that the partitioning heat sealed portion is formed obliquely can be applied to the stand pack type packaging bag 1 according to the second embodiment and to the packaging bag 1 in the form of joined palms according to the third embodiment.

In particular, even if the partitioning heat sealed portion is formed obliquely, a heat sealed portion that is narrower than a heat sealed portion extending perpendicularly to the film flowing direction can be provided in the middle of this partitioning heat sealed portion.

In each of the above described embodiments, the packaging bag 1 is made of the film material of the two layer structure formed by laminating the layer 3 outside the layer 2 constituting the inner surface side, the layer 3 constituting the outer surface side and comprising a resin having a higher melting point than the layer 2. The film material may undergo aluminum evaporation and is not particularly limited. Only the layer 2 constituting the inner surface side needs to meet the above described conditions. In addition, in each of the above described embodiments, although detailed description is omitted, the film material contains an addictive such as an antiblocking agent, a slip agent, or an oxidation agent as required. Furthermore, the shape of the packaging bag 1 may be determined as appropriate depending on the type of the contents.

What is claimed is:

1. A packaging bag made of a synthetic resin film as a material, wherein a layer constituting an inner surface is formed of a blend of straight-chain low-density polyethylene resin and polybutene-1 resin, and an internal space of the packaging bag is partitioned by a partitioning heat sealed portion that is parallel with opposite heat sealed portions extending perpendicularly to a flowing direction of the film and which is narrower than the opposite heat sealed portions, so as to form a plurality of housing spaces.

2. The packaging bag according to claim 1, wherein a blend ratio between the straight-chain low-density polyethylene resin and the polybutene-1 resin is between 70:30 and 98:2.

3. A packaging bag made of a synthetic resin film as a material, wherein a layer constituting an inner surface is formed of a blend of straight-chain low-density polyethylene resin and polybutene-1 resin, and an internal space of the packaging bag is partitioned by a partitioning heat sealed portion having a heat sealed portion that is parallel with opposite heat sealed portions extending perpendicularly to a flowing direction of the film and which is narrower than the opposite heat sealed portions, so as to form a plurality of housing spaces.

4. The packaging bag according to claim 3, wherein a blend ratio between the straight-chain low-density polyethylene resin and the polybutene-1 resin is between 70:30 and 98:2.

5. A packaging bag made by using a synthetic resin film as a material, wherein a layer constituting an inner surface is formed of a blend of straight-chain low-density polyethylene resin and polybutene-1 resin, and an internal space of the packaging bag is partitioned by a partitioning heat sealed portion that is formed obliquely with respect to opposite heat sealed portions extending perpendicularly to a flowing direction of the film and which is narrower than the opposite heat sealed portions, so as to form a plurality of housing spaces.

6. The packaging bag according to claim 5, wherein a blend ratio between the straight-chain low-density polyethylene resin and the polybutene-1 resin is between 70:30 and 98:2.

7. A packaging bag made by using a synthetic resin film as a material, wherein a layer constituting an inner surface is formed of a blend of straight-chain low-density polyethylene resin and polybutene-1 resin, and an internal space of the packaging bag is partitioned by a partitioning heat sealed portion having a heat sealed portion that is formed obliquely with respect to opposite heat sealed portions extending perpendicularly to a flowing direction of the film and which is narrower than the opposite heat sealed portions, so as to form a plurality of housing spaces.

8. The packaging bag according to claim 7, wherein a blend ratio between the straight-chain low-density polyethylene resin and the polybutene-1 resin is between 70:30 and 98:2.

\* \* \* \* \*